United States Patent
Obuchi et al.

(10) Patent No.: US 9,560,602 B2
(45) Date of Patent: *Jan. 31, 2017

(54) ERROR RATE CONTROL APPARATUS

(75) Inventors: Kazuhisa Obuchi, Kawasaki (JP); Tetsuya Yano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 381 days.

This patent is subject to a terminal disclaimer.

(21) Appl. No.: 12/842,225

(22) Filed: Jul. 23, 2010

(65) Prior Publication Data

US 2010/0296490 A1 Nov. 25, 2010

Related U.S. Application Data

(60) Continuation of application No. 11/616,455, filed on Dec. 27, 2006, which is a division of application No.
(Continued)

(51) Int. Cl.
*H04L 1/20* (2006.01)
*H04W 52/20* (2009.01)
(Continued)

(52) U.S. Cl.
CPC .......... H04W 52/228 (2013.01); H04L 1/0001 (2013.01); H04L 1/0025 (2013.01); H04L 1/0033 (2013.01); H04L 1/0039 (2013.01); H04L 1/20 (2013.01); H04W 52/20 (2013.01); H04W 52/246 (2013.01); H04W 52/281 (2013.01); H04W 52/325 (2013.01); H04L 1/0061 (2013.01); Y02B 60/50 (2013.01)

(58) Field of Classification Search
CPC ............. H04W 52/228; H04W 52/281; H04W 52/246; H04W 52/20; H04W 52/325; H04L 1/20; H04L 1/0001; H04L 1/0025; H04L 1/0039; H04L 1/0033; H04L 1/0061; Y02B 60/50
USPC .......... 455/522, 69, 13.4, 127.1, 127.5, 574; 370/252, 318, 320, 335, 342, 441, 332, 333
See application file for complete search history.

(56) References Cited

U.S. PATENT DOCUMENTS 5,870,393 A 2/1999 Yano et al.
5,898,682 A 4/1999 Kanai
(Continued)

FOREIGN PATENT DOCUMENTS

EP 0949768 10/1999
EP 1009107 6/2000
(Continued)

OTHER PUBLICATIONS

3GPP TS 25.211 V3.4.0 (Sep. 2000); 3rd Generation Partnership Project; Technical Specification Group Radio Access Network; Physical Channels and Mapping of Transport Channels onto Physical Channels (FDD) (Release 1999); (pp. 17-21).
(Continued)

*Primary Examiner* — George Eng
*Assistant Examiner* — Joseph Dean, Jr.
(74) *Attorney, Agent, or Firm* — Myers Wolin, LLC

(57) ABSTRACT

A wireless communication system comprising a transmitter configured to transmit a data signal and a control signal to the same mobile station and a control unit configured to regulate transmission power of the control signal in accordance with a reception status of the control signal in the mobile station.

16 Claims, 18 Drawing Sheets

Related U.S. Application Data

10/609,492, filed on Jun. 25, 2003, now Pat. No. 7,159,155, which is a continuation of application No. PCT/JP00/09242, filed on Dec. 26, 2000.

(51) Int. Cl.
| | |
|---|---|
| *H04W 52/22* | (2009.01) |
| *H04L 1/00* | (2006.01) |
| *H04W 52/24* | (2009.01) |
| *H04W 52/28* | (2009.01) |
| *H04W 52/32* | (2009.01) |

(56) References Cited

U.S. PATENT DOCUMENTS

| | | | |
|---|---|---|---|
| 5,924,043 A * | 7/1999 | Takano | 455/522 |
| 6,119,018 A | 9/2000 | Kondo | |
| 6,154,659 A | 11/2000 | Jalali et al. | |
| 6,330,462 B1 | 12/2001 | Chen | |
| 6,343,218 B1 | 1/2002 | Kaneda et al. | |
| 6,351,651 B1 | 2/2002 | Hamabe et al. | |
| 6,567,645 B1 | 5/2003 | Wiedeman et al. | |
| 6,567,670 B1 * | 5/2003 | Petersson | H04W 36/0083 370/331 |
| 6,571,104 B1 * | 5/2003 | Nanda | H04W 52/12 370/318 |
| 6,633,552 B1 | 10/2003 | Ling et al. | |
| 6,690,652 B1 | 2/2004 | Sadri | |
| 6,754,506 B2 | 6/2004 | Chang et al. | |
| 6,879,813 B2 | 4/2005 | Reznik | |
| 6,904,290 B1 * | 6/2005 | Palenius | 455/522 |
| 6,922,389 B1 | 7/2005 | Lundby | |
| 6,925,286 B1 * | 8/2005 | Kraiem | H04W 52/08 455/13.4 |
| 6,963,753 B1 | 11/2005 | Hamabe | |
| 6,977,910 B1 | 12/2005 | Hosur et al. | |
| 2002/0009061 A1 * | 1/2002 | Willenegger | 370/328 |
| 2002/0016179 A1 | 2/2002 | Baker et al. | |
| 2002/0082020 A1 | 6/2002 | Lee et al. | |
| 2002/0115464 A1 | 8/2002 | Hwang et al. | |
| 2003/0031145 A1 | 2/2003 | Zeira et al. | |
| 2005/0037761 A1 * | 2/2005 | Baker et al. | 455/442 |

FOREIGN PATENT DOCUMENTS

| | | |
|---|---|---|
| EP | 1039657 | 9/2000 |
| JP | 08-251141 | 9/1996 |
| JP | 2000-101511 | 4/2000 |
| JP | 2000-183812 | 6/2000 |
| JP | 2001-069074 | 3/2001 |
| WO | 98/58461 | 12/1998 |

OTHER PUBLICATIONS

United States Patent & Trademark Office "Non-final Office Action" for corresponding U.S. Appl. No. 10/609,492, mailed Aug. 16, 2004.
United States Patent & Trademark Office (USPTO) "Final Office Action" for corresponding U.S. Appl. No. 10/609,492, mailed Jan. 26, 2005.
United States Patent & Trademark Office "Restriction" for corresponding U.S. Appl. No. 10/609,492, mailed Dec. 14, 2005.
United States Patent and Trademark Office (USPTO) "Non-Final Office Action" for corresponding U.S. Appl. No. 10/609,492, mailed May 2, 2006.
United States Patent and Trademark Office (USPTO) "Non-Final Office Action" for corresponding U.S. Appl. No. 11/616,455, mailed Jun. 9, 2009.
United States Patent and Trademark Office (USPTO) "Non-Final Office Action" for corresponding U.S. Appl. No. 11/616,455, mailed Feb. 5, 2010.
Supplementary European Search Report for corresponding International Patent Application No. PCT/JP0009242, (European Patent Application No. 00985893.7), mailed Jul. 30, 2009.
European Patent Office "Official Communication" for corresponding European Patent Application No. 00 985 893.7, dated Jun. 29, 2010.
Official Office Action issued by the United States Patent and Trademark Office for corresponding U.S. Appl. No. 11/616,455 mailed Mar. 16, 2012.
Non-Final Office Action issued by the United States Patent and Trademark Office for corresponding U.S. Appl. No. 11/616,455, mailed Jan. 9, 2013.
Final Office Action issued by the United States Patent and Trademark Office for corresponding U.S. Appl. No. 11/616,455, dated Aug. 19, 2013.
Non-Final Office Action corresponding to U.S. Appl. No. 11/616,455, mailed on Dec. 31, 2013.
Final Office Action issued by the United States Patent and Trademark Office for corresponding U.S. Appl. No. 11/616,455 electronically delivered Jul. 24, 2014.
Communication pursuant to Article 94(3) EPC issued for corresponding European Application No. 09 173 493.9 mailed on Dec. 22, 2015.
Final Office Action issued by the United States Patent and Trademark Office for corresponding U.S. Appl. No. 11/616,455 electronically delivered on Oct. 1, 2010.
Non-Final Office Action issued by the United States Patent and Trademark Office for corresponding U.S. Appl. No. 11/616,455 electronically delivered on Mar. 17, 2011.
Final Office Action issued by the United States Patent and Trademark Office for corresponding U.S. Appl. No. 11/616,455 electronically delivered on Oct. 11, 2011.
Final Office Action issued by the United States Patent and Trademark Office for corresponding U.S. Appl. No. 11/616,455 electronically delivered on Sep. 7, 2012.
Communication pursuant to Article 94(3) EPC issued for corresponding European Application No. 10 169 365.3 mailed on Dec. 22, 2015.
Non-Final Office Action issued by the United States Patent and Trademark Office for corresponding U.S. Appl. No. 11/616,455 electronically delivered on Mar. 6, 2015.
Office Action issued for corresponding European Patent Application No. 00 985 893.7 dated May 28, 2015.
Communication pursuant to Article 94(3) EPC issued for corresponding European Patent Application No. 00 985 893.7 mailed on Jun. 28, 2016.
Communication pursuant to Article 94(3) EPC issued for corresponding European Patent Application No. 12 168 025.0 mailed on Jun. 28, 2016.
Communication pursuant to Article 94(3) EPC issued for corresponding European Patent Application No. 12 168 021.9 mailed on Jun. 28, 2016.

* cited by examiner

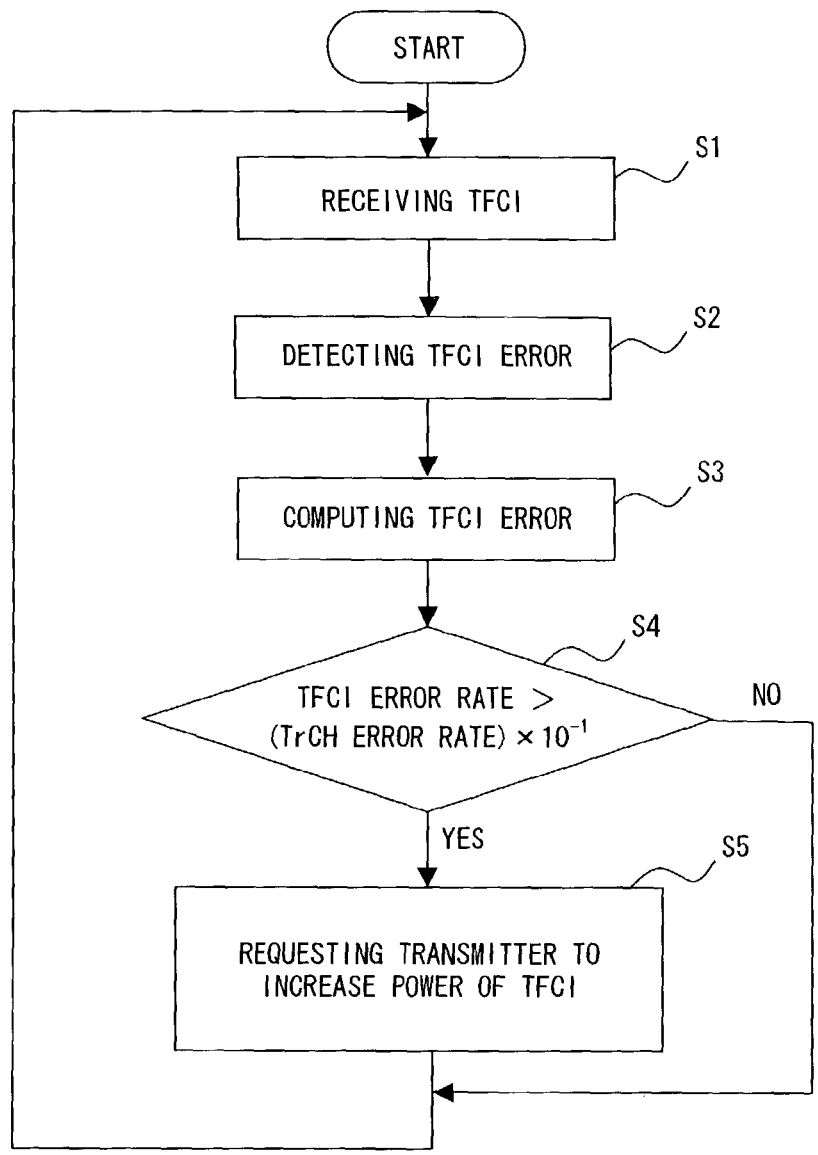
F I G. 1

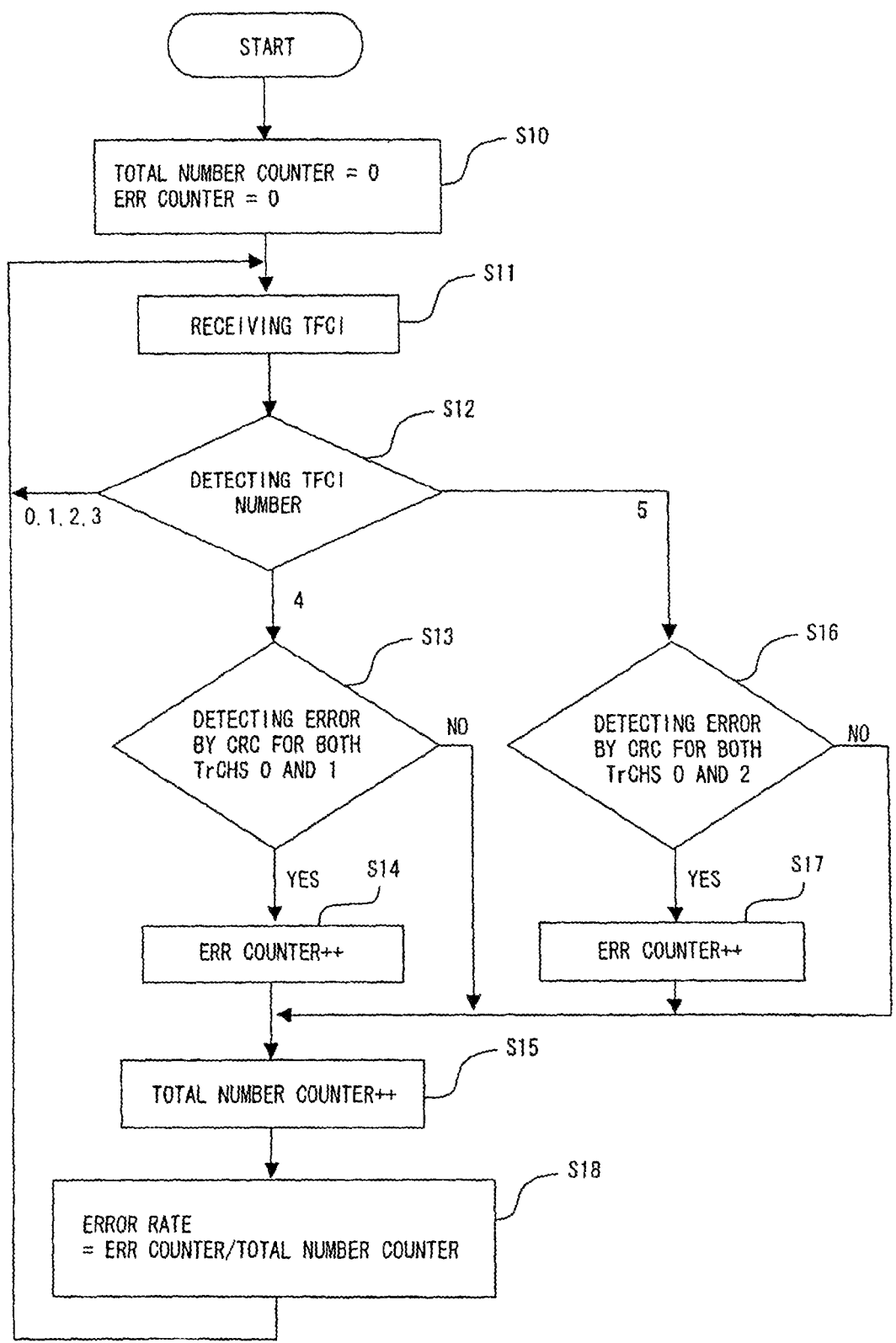
F I G. 2

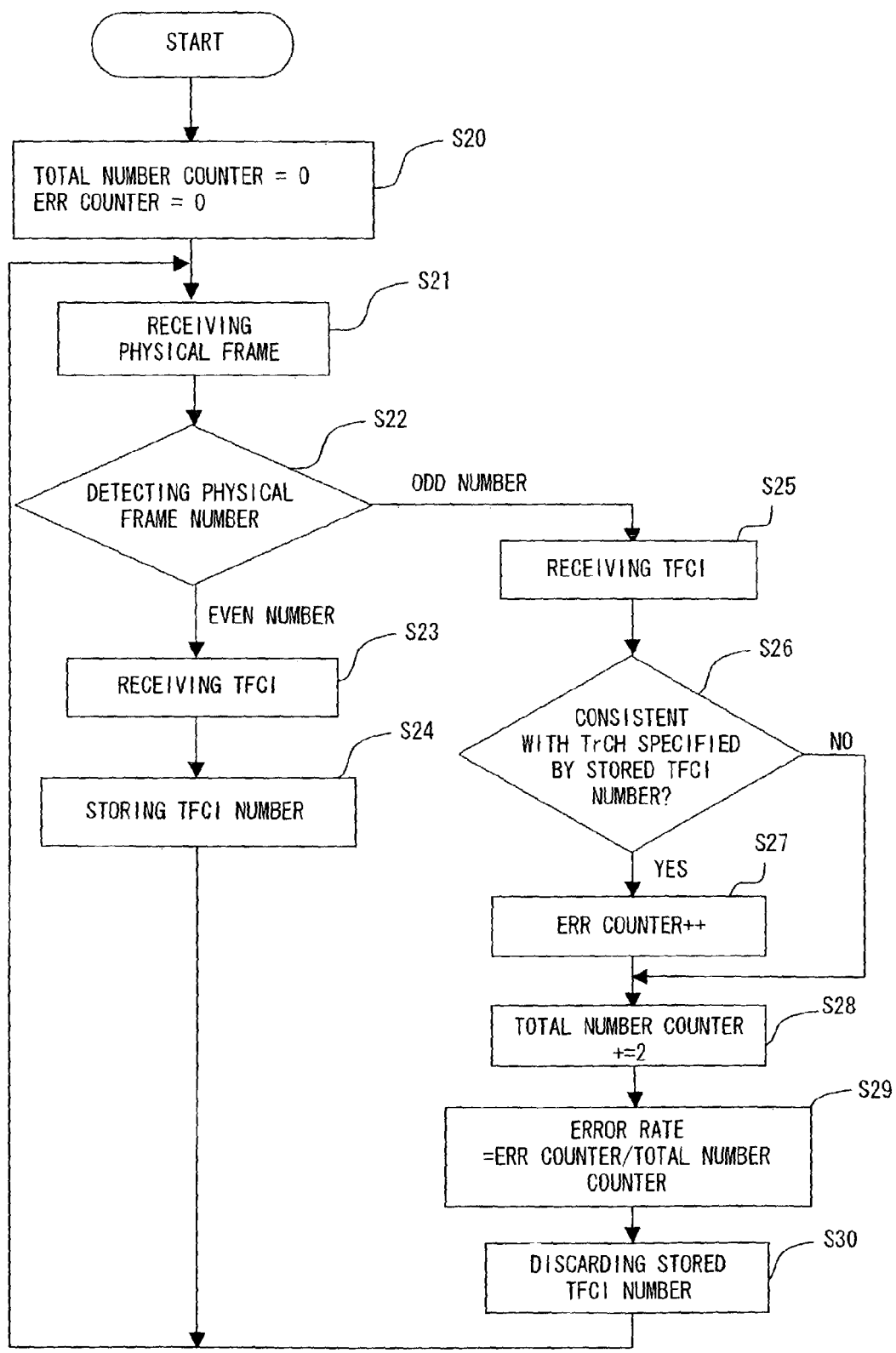
F I G. 5

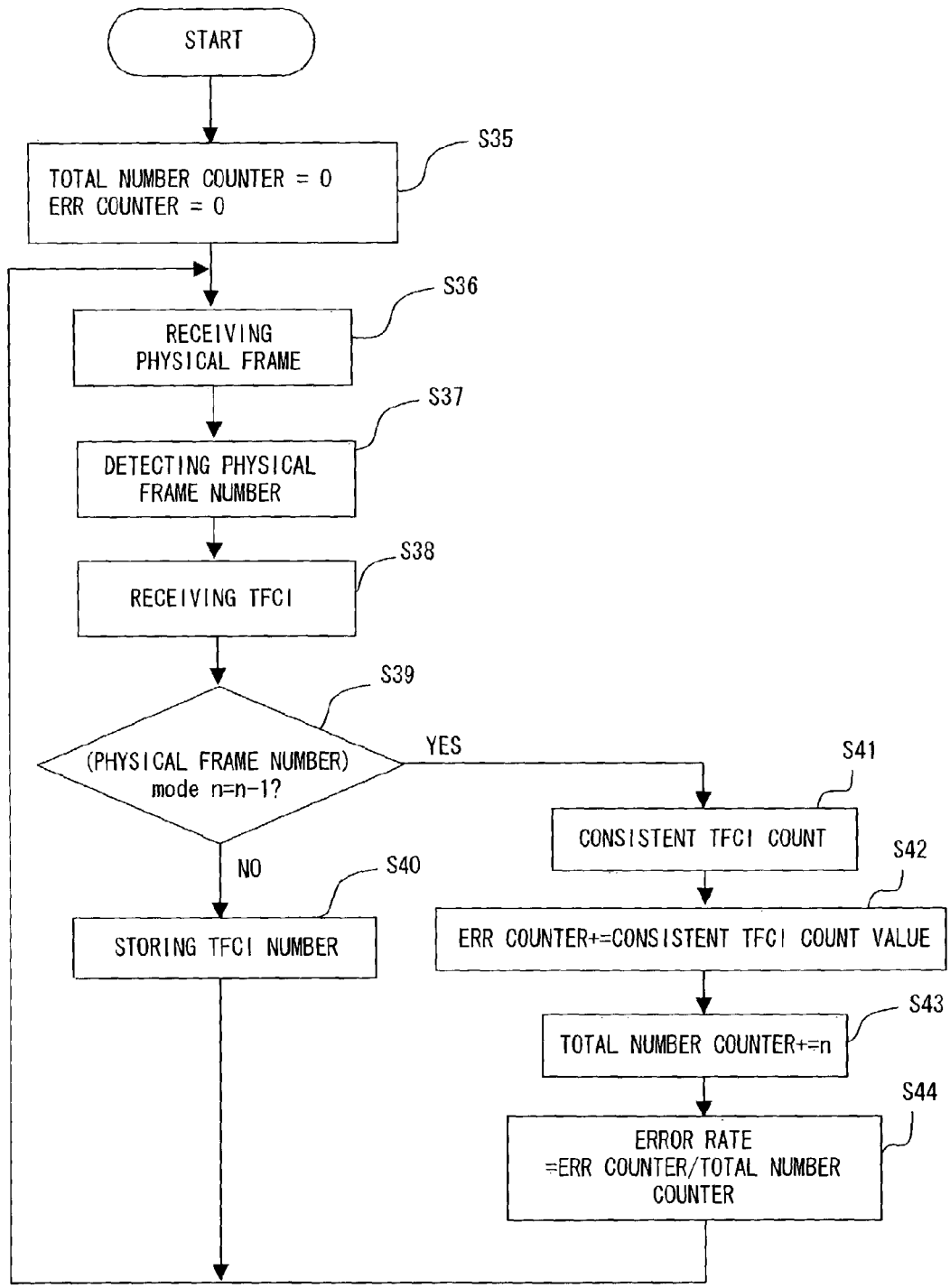
F I G. 7

| Combination | TFCI | NUMBER OF TrBKS | | |
|---|---|---|---|---|
| | | TrCH0 | TrCH1 | TrCH2 |
| 0 | 0 | 0 | 0 | 0 |
| 1 | 1 | 1 | 0 | 0 |
| 2 | 2 | 2 | 0 | 0 |
| 3 | 3 | 0 | 1 | 0 |
| 4 | 4 | 1 | 1 | 0 |
| 5 | 5 | 2 | 1 | 0 |
| 6 | 6 | 0 | 2 | 0 |
| 7 | 7 | 1 | 2 | 0 |
| 8 | 8 | 0 | 0 | 1 |
| 9 | 9 | 1 | 0 | 1 |
| 10 | 10 | 2 | 0 | 1 |
| 11 | 11 | 0 | 1 | 1 |
| 12 | 12 | 1 | 1 | 1 |
| 13 | 13 | 0 | 2 | 1 |

FIG. 8

| Combination | TFCI | NUMBER OF TrBKS | | | TOTAL NUMBER OF TrBKS |
|---|---|---|---|---|---|
| | | TrCH0 | TrCH1 | TrCH2 | |
| 0 | 0 | 0 | 0 | 0 | 0 |
| 1 | 1 | 1 | 0 | 0 | 1 |
| 2 | 2 | 2 | 0 | 0 | 2 |
| 3 | 3 | 0 | 1 | 0 | 1 |
| 4 | 4 | 1 | 1 | 0 | 2 |
| 5 | 5 | 2 | 1 | 0 | 3 |
| 6 | 6 | 0 | 2 | 0 | 2 |
| 7 | 7 | 1 | 2 | 0 | 3 |
| 8 | 8 | 0 | 0 | 1 | 1 |
| 9 | 9 | 1 | 0 | 1 | 2 |
| 10 | 10 | 2 | 0 | 1 | 3 |
| 11 | 11 | 0 | 1 | 1 | 2 |
| 12 | 12 | 1 | 1 | 1 | 3 |
| 13 | 13 | 0 | 2 | 1 | 3 |

F I G. 1 3

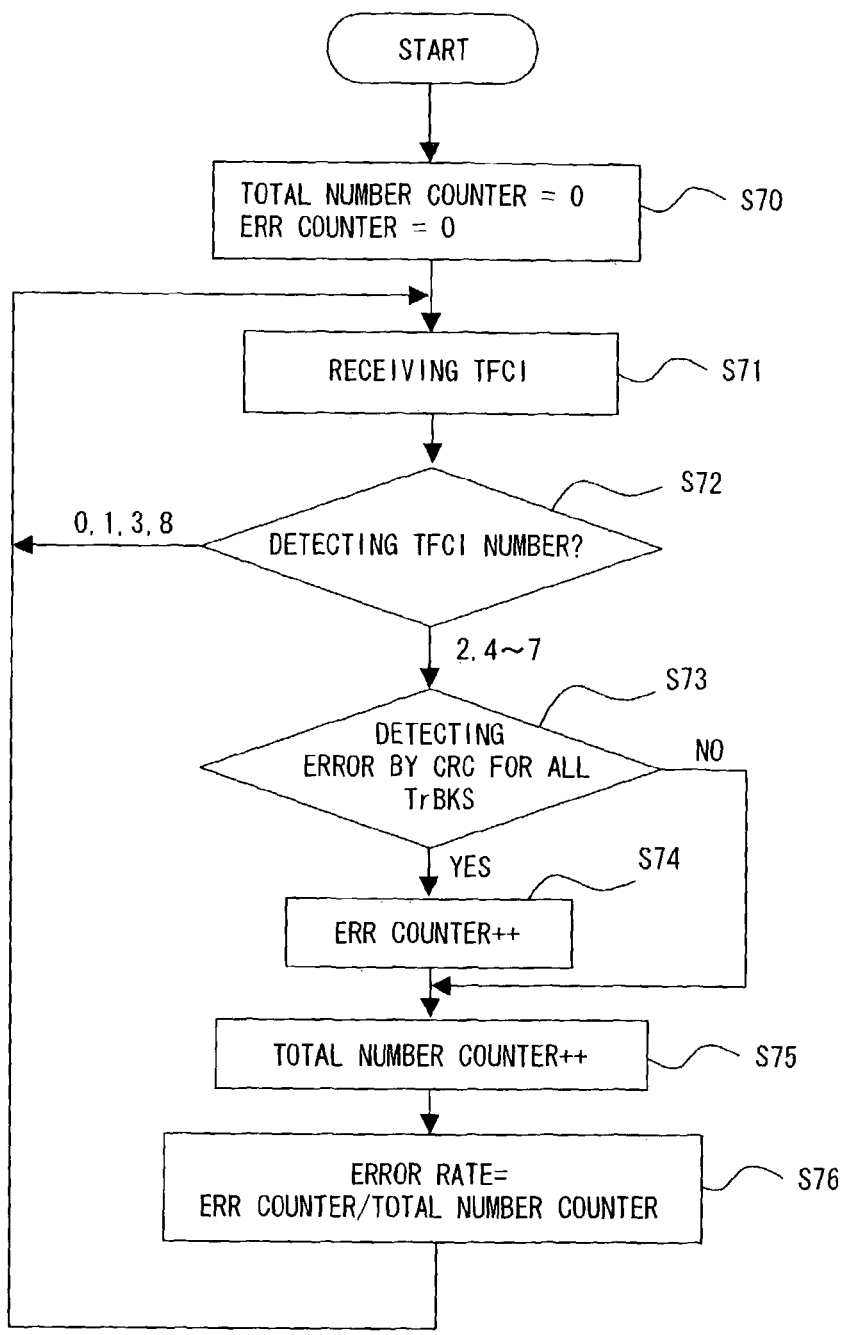
F I G. 14

ERROR RATE CONTROL APPARATUS

CROSS REFERENCE TO RELATED APPLICATION

This application is a continuation of application Ser. No. 11/616,455, filed Dec. 27, 2006, now pending, which is a divisional of application Ser. No. 10/609,492, filed on Jun. 25, 2003, which is a continuation of international PCT application No. PCT/JP00/09242 filed on Dec. 26, 2000, each of which are incorporated herein by reference.

BACKGROUND OF THE INVENTION

Field of the Invention

The present invention relates to an error rate control apparatus for use in a wireless communication system.

Description of the Related Art

Recently, mobile telephones have become widespread, and are expected to further extend its market. Furthermore, in the next-generation mobile telephone system, there is the tendency to set the worldwide standards and configure a mobile telephone system of common standards in the world.

In the mobile telephone system, a communications system in which a plurality of transport CHs (or a logic CH) are multiplexed and mapped to the physical CH, and a control signal indicating the format of a transport CH is also mapped to the physical CH is being realized. For example, the W-CDMA, which is one of the next-generation mobile telephone system (IMT-2000), corresponds to the above mentioned system. In the W-CDMA, the TrCH (Transport Channel) such as a voice signal, multimedia data, a control signal, etc. is multiplexed, and mapped to the physical CH for transmission. To improve the transmission efficiency, the mapping to the physical CH is changed in a physical frame unit if it is not necessary to transmit multimedia data during the communications, or a voice signal is unnecessary. At this time, a control signal indicating the format of the TrCH referred to as TFCI (Transport Format Combination Indicator) is used.

Consider that signals to be transmitted can be any of the three types of 100, 200, 300 bits respectively referred to TrCH0, TrCH1, and TrCH2. When they are mapped to the physical CH, they are assumed to be transmitted in any of the following combinations, and the TFCI is defined as follows. The combinations are determined in advance between the transmitter and the receiver, and the other combinations are not allowed.

Combination 0: TFCI=0 for no signals
Combination 1: TFCI=1 for only TrCH0
Combination 2: TFCI=2 for only TrCH1
Combination 3: TFCI=3 for only TrCH2
Combination 4: TFCI=4 for TrCH0+TrCH1
Combination 5: TFCI=5 for TrCH0+TrCH2

When transmitting TrCH0 and TrCH1, the transmitter transmits TrCH0 and TrCH1 with TFCI=4.

FIG. 16 is a block diagram showing the configuration of the transmitting device.

A buffer for TrCH0, a buffer for TrCH1, and a buffer for TrCH2 buffer the data of the respective transport channels, and transmit the data of the respective transport channels through a selection device 10 at the next stage. The selection device 10 selects the data of the transport channel input from each buffer. For example, when only TrCH0 is transmitted as in the above mentioned Combination 1, the buffer for TrCH0 is selected for transmission of data. An error control, etc. process unit 11 transmits data after adding an error detection code such as a CRC to each piece of frame data of each transport channel.

Then, a composition unit 12 composes data of each transport channel for mapping to the physical frame. When a slot is completed for mapping to the composed and generated physical frame, a TFCI addition unit 13 adds a TFCI. Furthermore, a TPC and PILOT addition unit 14 adds a TPC and a PILOT signal to a slot. Then, a modulator 15-1 of a radio unit 15 modulates data, and an amplifier 15-2 amplifies a modulation signal and transmits it through an antenna 16.

A physical frame of a physical channel comprises 15 slots. Therefore, for example, if one unit of the TFCI data is transmitted by one physical frame, then one unit of the TFCI is divided into 15 pieces and then transmitted.

Furthermore, a control device 17 receives an instruction from an upper layer about power of which data in one slot is set to what magnitude. According to the instruction the control device 17 controls the amplification gain of the amplifier 15-2.

FIG. 17 is a block diagram showing the configuration of a receiving device.

First, a signal received by an antenna 20 is demodulated by a radio unit 21, and a TFCI detection unit 22 detects a set value of the TFCI. Then, based on the detected TFCI, a TrCH division unit 23 separates a transport channel, and a error control, etc. process unit 24 detects an error, and the respective transport channels are input into the TrCH0, TrCH1, and TrCH2 buffers, and transmitted to the processing unit at the subsequent stage.

That is, the receiver first determines the TFCI, and if TFCI=4, then it proves TrCH0+TrCH1, and the process of dividing a signal into the TrCH0 and the TrCH1.

As described above, the TFCI is an important signal for transmission of a signal. If a TFCI is mistakenly received, then all TrCH signals are mistakenly processed. Therefore, the TFCI is designed for larger transmission power by the transmitter.

FIG. 18 shows the data format of the down line of the W-CDMA.

FIG. 18 shows the configuration of one slot. As described above, fifteen slots form one physical frame. The TPC, TFCI, and PL are overhead. That is, the TPC sets data for transmission power control, and the PL is a pilot signal. A TrCH signal is mapped to the Data 1 and Data 2. The PO1 is a power offset value of the TrCH and TFCI.

The transmission power control is performed by the receiver measuring the error rate of the TrCH, and requesting the transmitter to satisfy the requirements for the quality. For example, if the obtained error rate is higher than a predetermined error rate as a result of the measurement of the error rate of the TrCH, the receiver requests the transmitter to increase the transmission power by 1 dB. In response to the request, the transmitter increases the transmission power by, for example, 1 dB, and transmits it with the values of the PO1 through PO3 maintained.

Therefore, although the TFCI is wrong, the TrCH is mistakenly considered to be wrong, and the transmission power is requested to be increased for all data, TPC, TFCI, and PL. Therefore, if the TFCI is wrong, it is necessary to increase the transmission power of the TFCI only. However, the transmission power of the data portion is also increased, and the transmission power becomes unnecessarily large for the data portion, thereby wasting electric power.

For example, when a 64-kbps signal is transmitted, TFCI=8 bits, TPC=4 bits, and PL=8 bits for Data 1+Data 2=28+112 bits. Since the power is increased entirely (160 bits) when only the power of TFCI=8 bits is to be increased, thereby wasting the transmission power 160/8=20 times as much as the actually required power.

SUMMARY OF THE INVENTION

The present invention aims at reducing wasteful power consumption and providing an error rate control apparatus to control an error rate.

The present invention includes a radio communication apparatus transmitting a data signal and a control signal to another radio communication apparatus, including a controller controlling transmission power of said control signal separately from transmission power of said data signal based on a feedback signal from the other radio communication apparatus.

The control method according to the present invention for controlling transmission power of a control signal for a channel shared by plural users, includes determining transmission power of a channel dedicated to a user and setting transmission power of a timeslot of said control signal in relation to said transmission power of the channel dedicated to a user that uses the timeslot transmitting signals over said control channel with the set power.

According to the present invention, the power of the control signal required in establishing the communications is controlled separately from the data signal Since the power of the data signal, etc. is maintained as is, the wasteful power consumption can be reduced when the data signal length is long and the relative length of the control signal is short. That is, when an instruction is issued using a transmission power control request to the transmitter to increase the transmission power to correctly receive the control signal (that is, when an error rate is to be reduced by raising the transmission power), only the power for the control signal is to be increased rather than to increase the power of the entire signals so that wasteful power can be reduced, power consumption can be reduced, and a control signal can be correctly received.

BRIEF DESCRIPTION OF THE DRAWINGS

FIG. 1 is a flowchart showing the receiving process according to an embodiment of the present invention;

FIG. 2 is a flowchart showing the first example of a practical method of measuring an error rate of the TFCI according to an embodiment of the present invention;

FIG. 5 is a flowchart of the second practical example of the TFCI error rate measuring method;

FIG. 7 shows a chart (1) of the third practical example of the TFCI error rate arithmetic method using the TrCH in an n physical frame unit;

FIG. 8 shows a chart (2) of the third practical example of the TFCI error rate arithmetic method using the TrCH in an n physical frame unit;

FIG. 13 shows the fifth practical example (2) including all algorithms for the first through fourth examples of a TFCI error detecting method;

FIG. 14 shows the fifth practical example (3) including all algorithms for the first through fourth examples of a TFCI error detecting method;

DESCRIPTION OF THE PREFERRED EMBODIMENTS

According to an embodiment of the present invention, in a communications system in which a plurality of transport CHs (or logic CHs) are multiplexed and mapped to a physical CH through which a plurality of physical frames are transmitted, and a control signal indicating the format of the transport CH is similarly mapped to the physical CH, the error rate of the control signal is measured, and the power control of only the control signal, thereby suppressing the interference with other stations and performing the communications with high circuit quality.

Figure 18:
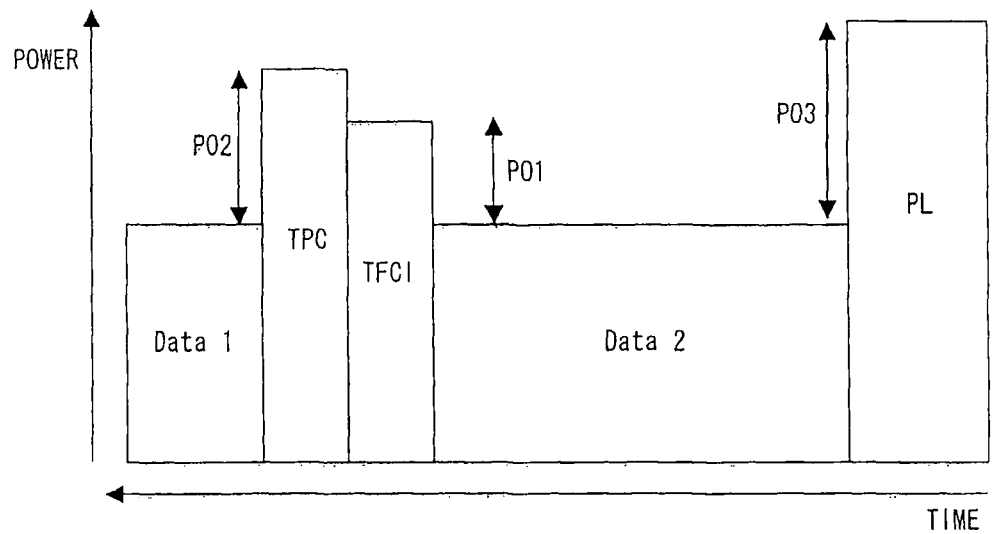
FIG. 18 shows the data format of a down line of a W-CDMA.

Conventionally, since the error rate of the TFCI is not measured, the above mentioned method is to be used. Then, in addition to the measurement of the error rate of the TrCH, the error rate of the TFCI is measured. If the required quality of the TFCI has not been attained, the transmitter is requested to increase the PO1 (offset value: refer to FIG. 18). In response to the request, the transmitter controls the transmission power of only the TFCI. That is, the transmission power of only 8 bits is controlled.

Thus, unlike the conventional examples, the TFCI=8 bits only can be increased without increasing the transmission power of 160 bits, thereby consuming only ½₀ of the conventional power consumption although the power value is increased, and largely suppressing the interference with other stations.

In this example, the user rate is 64 kbps (1B), and with an increasing user rate, the effect becomes more apparent.

With 384 kbps (6B) for example, TFCI=8 bits, TPC=8 bits, and PL=16 bits are used for Data 1+Data 2=120+488 bits. Although it is sufficient that the power of TFCI=8 bits is increased, the conventional technology increases the power of entire bits (640 bits), thereby wasting 640/8=80 times the required transmission power.

FIG. 1 is a flowchart of the receiving process according to an embodiment of the present invention.

According to an embodiment of the present invention, in a communications system in which a plurality of TrCHs are multiplexed and mapped to the physical CH, and the TFCI indicating the TrCH is similarly mapped to the physical CH, the transmission power is controlled by measuring the error rate of the TFCI.

First, in step S1, the TFCI is received. In step S2, an error is detected in the TFCI. In step S3, the error rate of the TFCI is computed. In step S4, it is determined whether or not the error rate is larger than the (error rate of the TrCH)×10⁻¹. The value of $10^{-1}$ which is a multiplier for the error rate of the TrCH is an example only.

If the determination in step S4 is NO, then control is returned to step S1, and the processes are repeated. It is the determination that the error of the TFCI can be ignored. On the other hand, if the determination in step S4 is YES, it is determined that the TFCI is wrong, and a request to increase the power of the TFCI is issued to the transmitter, thereby returning control to step S1.

FIG. 2 is a flowchart of the first example of a practical error rate measuring method of the TFCI according to an embodiment of the present invention.

The practical example is applied to the case in which a plurality of TrCHs are mapped to a physical channel, and the TrCHs are represented using an error detection code.

If the receiver detects that the TFCI specifies a plurality of TrCHs, but all TrCH are detected as wrong, then it is detected that the TFCI is wrong.

An error detecting process using a CRC is used to determine whether or not the TrCH is wrong.

An example of a case according to the conventional technology is described below. It is assumed that each TrCH forms a unit using one physical frame. For example, when the TFCI=4 is detected but both TrCH0 and TrCH1 are wrong, the TFCI is considered to be wrong.

Generally, the TFCI is a signal which is not to be wrong. Therefore, when the TrCH has a frame error rate of, for example, FER=$10^{-2}$, then the TFCI is set to, for example, FER=$10^{-3}$ or smaller.

Assume that the TFCI=4, but both TrCH0 and TrCH1 are wrong. In this case, the probability that both TrCH0 and TrCH1 are wrong is obtained by $10^{-2} \times 10^{-2} = 10^{-4}$, the probability that the TFCI is wrong is strong, it is determined in this case that the TFCI is wrong.

In the W-CDMA, a user signal and a control signal are mapped. Therefore, two or more TrCHs are normally mapped, and represented using an error detection code.

Described below is the flowchart shown in FIG. 2.

First, in step S10, the total number counter for counting the number of frames containing a plurality of TrCHs and the ERR counter for counting the number of frames in which an error occurs are initialized to 0. Then, in step S11, the TFCI is received. Then, in step S12, when a TFCI number is 4, control is passed to step S13. When the TFCI is 5, control is passed to step S16. In step S13, the TrCH0 and 1 are included, and an error detecting process is performed using a CRC (error detection code). If no error is detected in one of them, control is passed to step S15. If errors are detected in both of them, then the ERR counter is incremented by 1 in step S14, and control is passed to step S15. In step S15, the total number counter is incremented by 1, and in step S18, the error rate of the TFCI is computed by the error rate=(ERR counter value)/(total number counter value). Then, control is returned to step S11, and the processes are repeated. Since there are TrCH0 and 2 in step S16, the error detecting process is performed using a CRC. When there are errors in both of them, the ERR counter is incremented by 1 (step S17), control is passed to step S15, and then to step S15 without any intervening process if there are no errors in any of them.

In the above mentioned practical example, when there is one TrCH, the power of the TFCI is not controlled. If there is one TrCH, the data length of the Data 1 and Data 2 is shorter, and the length of the TFCI is relatively longer. Therefore, the wasteful power consumption can be relatively small in the conventional method. On the other hand, when there are two or more TrCHs, the length of the Data 1 and Data 2 is longer and the length of the TFCI is relatively shorter. Therefore, the wasteful power consumption is larger in the conventional method. Therefore, only when there are two or more TrCHs as in the present practical example, the TFCI power control according to the present embodiment can be effective.

Figure 3:
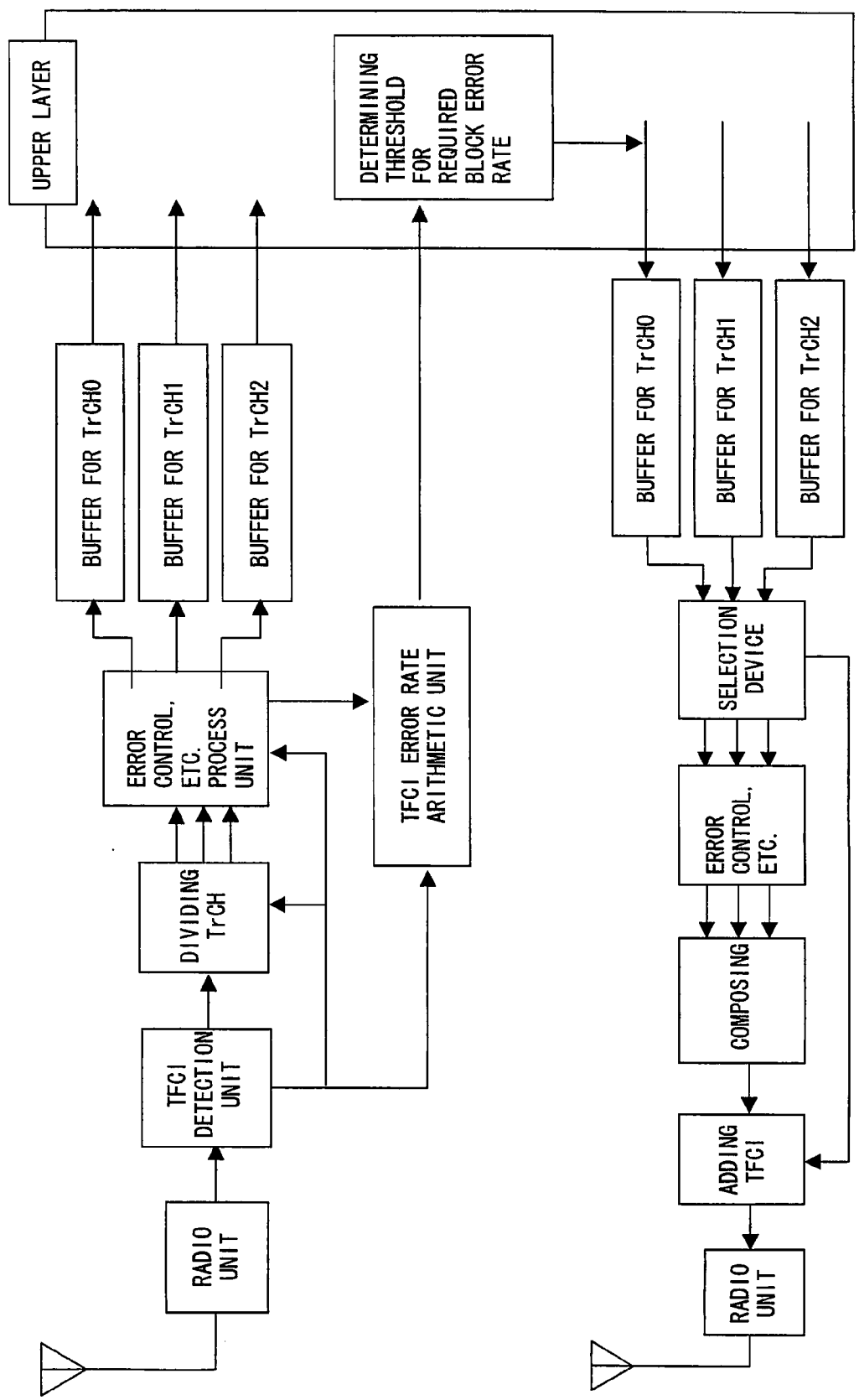
FIG. 3 shows the output of the TFCI error arithmetic circuit.

FIG. 3 shows the output of the TFCI error arithmetic circuit of the TFCI.

The TFCI value detected by the TFCI detection unit and the output from the error control, etc. process unit are input into the TFCI error rate arithmetic unit. From the TFCI detection unit, a signal indicating whether or not a plurality of TrCHs are to be transmitted, and a signal used by the total number counter in counting the total number counter value are input into the TFCI error rate arithmetic unit. When all specified TrCHs are NG in the error detection, the signal indicating it is input from the error control, etc. process unit into the TFCI error rate arithmetic unit.

The operation value from the TFCI error rate arithmetic unit is transmitted to an upper layer, and the upper layer determines the threshold relating to a predetermined block error rate. As a result, if it is determined that the transmission power is to be controlled, and, for example, the TrCH0 is loaded with a control signal, then the TrCH0 data is loaded with a transmission power control signal and input into the buffer for the TrCH0, and a transmission power control request signal is transmitted.

Described below is the second practical example of the TFCI error rate measuring method on the receiving side. In this practical example, the TFCI is mapped in a frame unit, and the TrCH is applied when it is mapped covering a plurality of physical frames. That is, the unit of the TFCI is mapped to one physical frame, but a unit of the TrCH is assumed to be mapped covering a plurality of physical frames.

Figure 4:
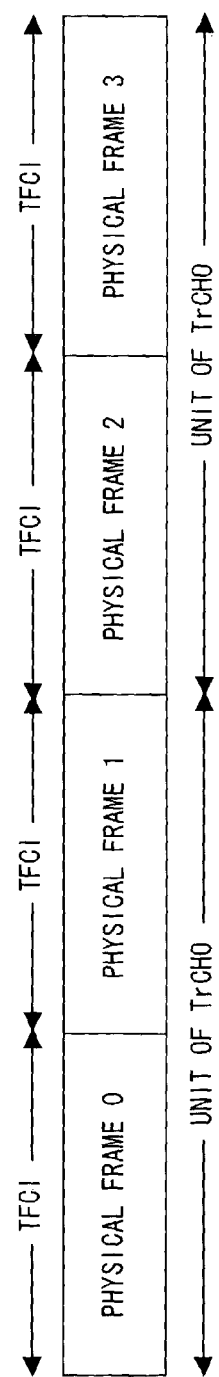
FIG. 4 shows an example of a TrCH in a 2 physical frame unit.

FIG. 4 shows an example of the TrCH of a 2-physical-frame unit.

For comprehensibility, it is assumed that a signal is transmitted in the following combinations.

Combination 0: TFCI=0 for no signals
Combination 1: TFCI=1 for only TrCH0

With the combinations above, the transmitter transmits the same TFCI for the physical frames 0 and 1. However, when the TFCIs are different between the physical frames 0 and 1, it is considered that one of the TFCIs is wrong.

In the W-CDMA, the TFCI is a signal in a frame unit, and the TrCH is a signal covering a plurality of frames.

FIG. 5 is a flowchart showing the second practical example of the TFCI error rate measuring method.

First, in step S20, the total number counter and the ERR counter are initialized to 0. Then, in step S21, a physical frame number is received. In step S22, a physical frame number is detected. When the physical frame number is an even number, a TFCI is received in step S23, and the TFCI number is stored, and control is returned to step S21. If it is determined that the physical frame number is an odd number in step S22, then control is passed to step S25, and the TFCI is received. In step S26, it is determined whether or not the TFCI number received in step S25 is consistent with the configuration of the TrCH contained in the frame specified by the stored TFCI number. If it is consistent, control is passed to step S28. If it is inconsistent, the ERR counter is incremented by 1 in step S27, and control is passed to step S28.

In step S28, the total number counter is incremented by 2 so that the number can be counted after checking the even number frame and the odd number frame. Then, in step S29, as in the above mentioned practical example, an error rate is computed. In step S30, the stored TFCI number is discarded, and control is returned to step S21.

Figure 6:
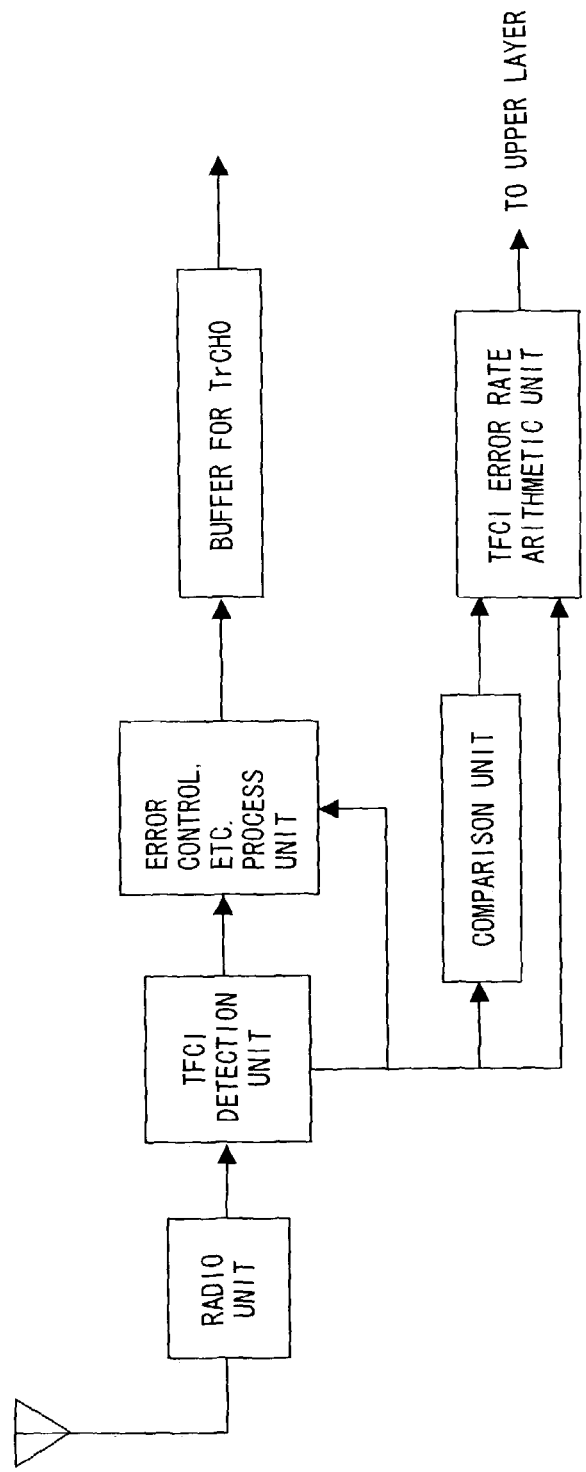
FIG. 6 is a block diagram of the TFCI error rate measurement device corresponding to the practical example shown in FIG. 5.

FIG. 6 is a block diagram of the TFCI error rate measurement device corresponding to the practical example shown in FIG. 5.

The signal received from the antenna is decoded by the radio unit, and the TFCI detection unit detects a TFCI number. Then, the error control, etc. process unit detects an error in the signal.

On the other hand, the TFCI number detected by the TFCI detection unit is input into the comparison unit and the TFCI error rate arithmetic unit. In the comparison unit, the previous TFCI value is compared with the current TFCI value, and it is determined whether or not inconsistency exists. The result is used by the TFCI error rate arithmetic unit performing the arithmetic process shown in FIG. 5. The TFCI number input from the TFCI detection unit to the TFCI error rate arithmetic unit is used by the TFCI total number counter specified by a plurality of TrCHs in operating the total number counter. Then, the arithmetic result of the TFCI error rate arithmetic unit is transmitted to an upper layer.

Figure 9:
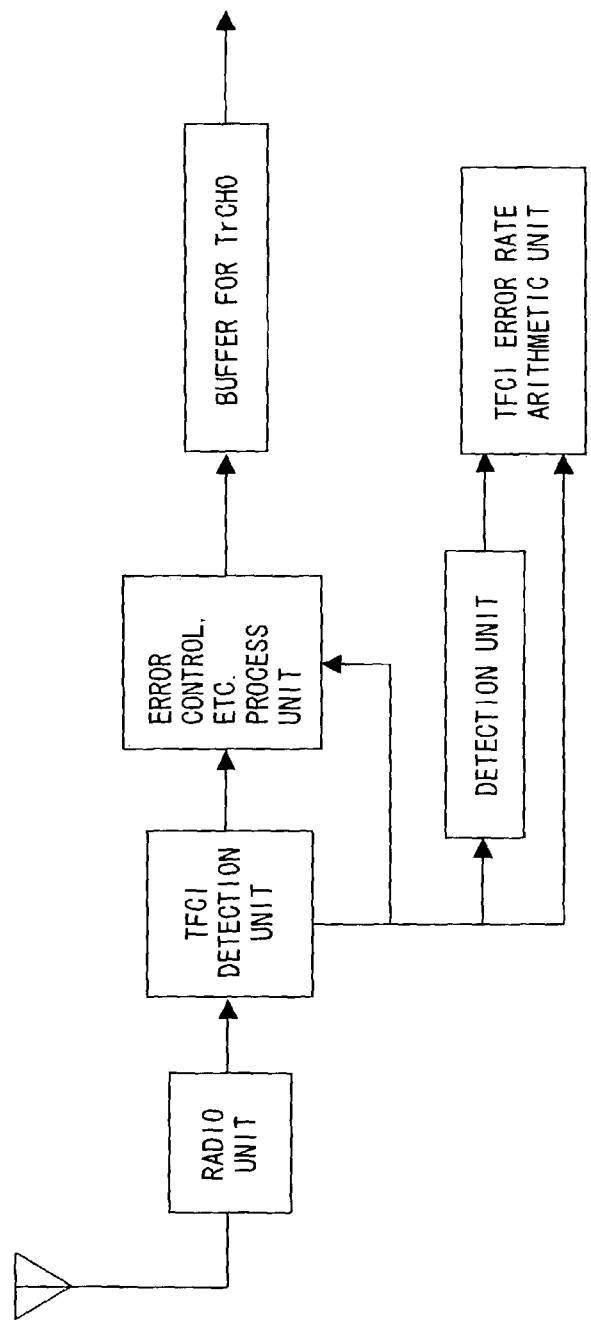
FIG. 9 shows a chart (3) of the third practical example of the TFCI error rate arithmetic method using the TrCH in an n physical frame unit.

FIGS. 7 through 9 show the case in which the TrCH is an n physical frame unit in the third practical example of the TFCI error rate arithmetic method.

In the W-CDMA, n=1, 2, 4, 8 (the number of physical frames covered by one unit of the TrCH) is applied. In the second practical example, n=2 only, as shown in FIG. 7 in which n is extended (4, 8). The present practical example cannot be applied with n=1.

In this example, the unit of the TrCH is formed by ((physical frame number) mod n=0)~((physical frame number) mod n=n−1).

When there are a plurality of TrCHs, for example, the number of TrCHs is 3 represented as follows.

TrCH0: 1 unit with 4 physical frames, 1 unit for transmission of 2TrBk (transport block) at maximum TrCH1: 1 unit with 2 physical frames, 1 unit for transmission of 2TrBk (transport block) at maximum TrCH2: 1 unit with 2 physical frames, 1 unit for transmission of 1TrBk (transport block) at maximum The combinations shown in FIG. 8 are used.

In this case, if the TrCH0 is selected for detection, only the TrCH0 attracts attention, and there is no signals, then TFCI=0, 3, 6, 8, 11, 13←Among these values, TFCIs are different, but is consistent.

If TrBk=1, TFCI=1, 4, 7, 9, 12←Among these values, TFCIs are different, but is consistent.

If TrBk=2, TFCI=2, 5, 10←Among these values, TFCIs are different, but is consistent.

Therefore, although there are 0 and 3 in the TFCIs in the physical frame forming one unit, the TFCIs are not inconsistent.

Described below is the flowchart shown in FIG. 7.

First, in step S35, the total number counter and the ERR counter are initialized to 0. In step S36, a physical frame is received. Then, in step S37, a physical frame number is detected. Then, in step S38, a TFCI is received. In step S39, it is determined whether or not (physical frame) mod n=n−1.

If the determination in step S39 is NO, then the TFCI number is stored in step S40, and control is returned to step S36. If the determination is NO in step S39, then it is determined in step S41 whether or not the received TFCI number is a TFCI counter value consistent with the stored TFCI number. The determining method can be any of the following methods.

1. To set a group having consistent TFCI values.
2. To select a group having the largest number of consistent TFCI values.
3. Different TFCI count value=n−(number of TFCI values in 2. above)

Then, in step S42, the ERR counter is incremented by the consistent TFCI count value. In step S43, the total number counter is incremented by n. In step S44, an error rate is computed, and control is returned to step S36.

FIG. 9 is a block diagram showing an example of the configuration of the error rate measurement circuit according to the third practical example.

First, the TFCI number detected by the TFCI detection unit is used by the ERR counter computing the number of n TFCI numbers inconsistent with the past TFCI number, thereby detecting an error. Then, the TFCI error rate arithmetic unit computes the error rate of the TFCIs from the output of the ERR detection unit and the output of the TFCI detection unit.

Figure 10:
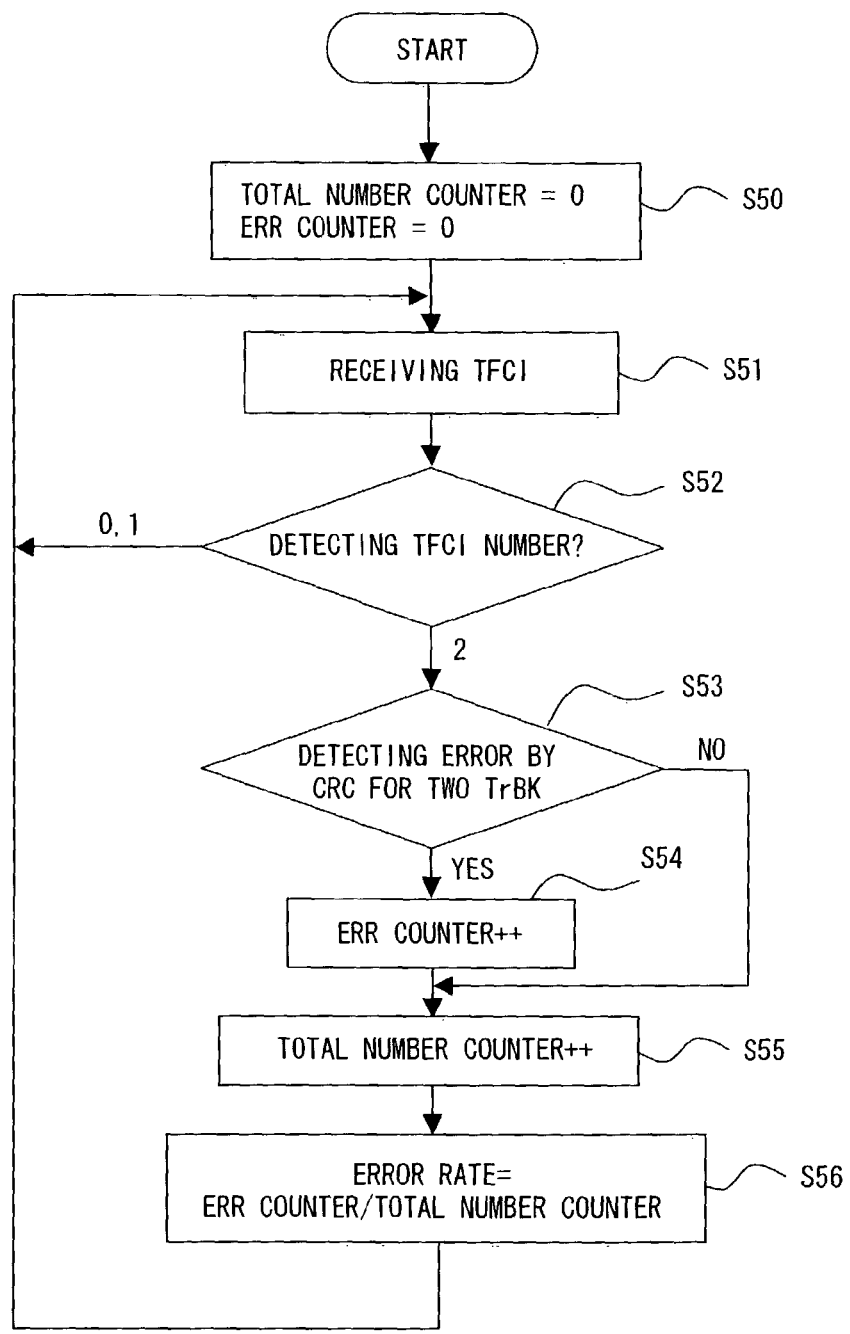
FIG. 10 shows the fourth practical example (1) of the TFCI error rate arithmetic method.
Figure 11:
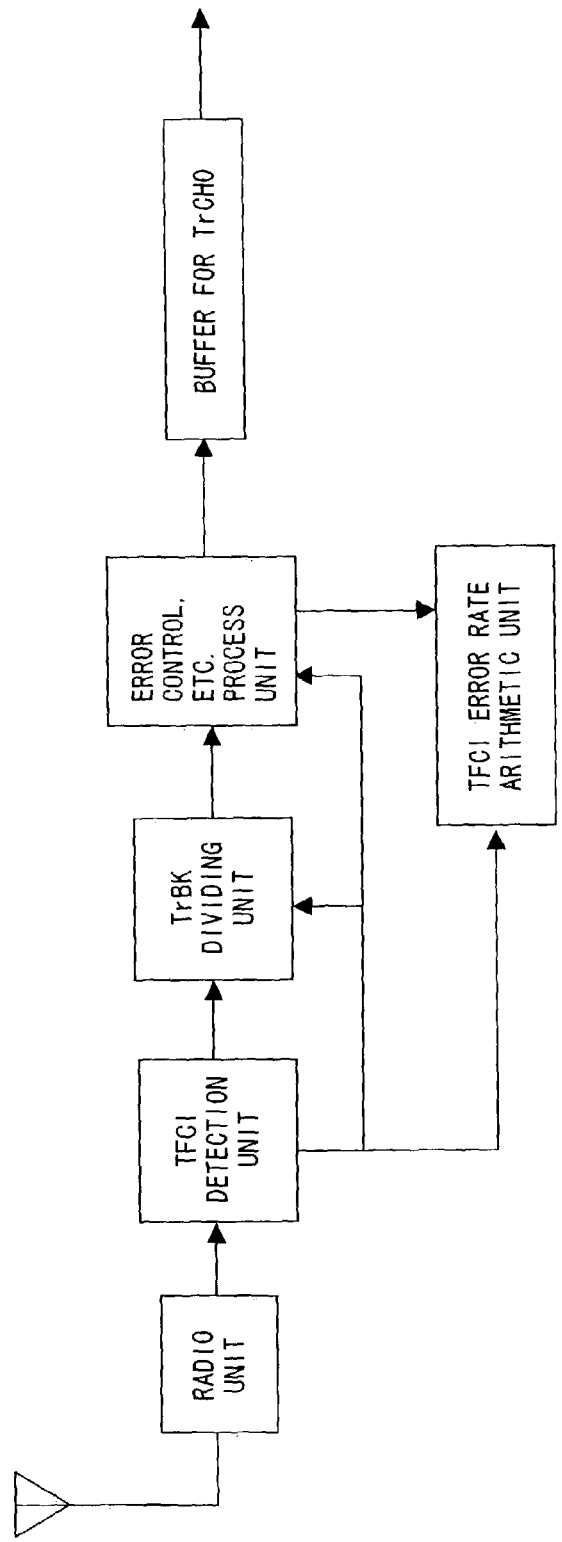
FIG. 11 shows the fourth practical example (2) of the TFCI error rate arithmetic method.

FIGS. 10 and 11 are explanatory views of the fourth practical example of the TFCI error rate arithmetic method.

The present practical example applies to the case in which a plurality of TrBks represented by error detection codes are mapped to one TrCH.

In the present practical example, the receiver detects the TFCI specifying a plurality of TrBks. However, when all TrBks are detected as erroneous, the TFCI is detected as erroneous. The error detecting process is performed using the CRC to determine whether or not the TFCI is erroneous.

For comprehensibility, in this example, the following combinations are used in transmitting a signal.

Combination 0: TFCI=0 for no signals
Combination 1: TFCI=1 for one TrBk of TrCH0
Combination 2: TFCI=2 for two TrBks of TrCH0

In this case, when TFCI=2 is detected and two TrBks are erroneous as a result of the CRC detection, the TFCI is considered to be erroneous. When one of them is correct as a result of the CRC detection, the TFCI is considered to be correct, thereby computing the error rate.

In the W-CDMA, a plurality of TrBks are used in the data communications with the coding gain of error detection code taken into account. Each TrBk is represented by an error detection code.

FIG. 10 is a flowchart of the process of the fourth practical example.

First, in step S50, the total number counter and the ERR counter are initialized to 0. Then, in step S51, a TFCI is received. In step S52, the TFCI number is detected. If the TFCI number is 0 or 1 in step S52, then control is returned to step S51.

If the TFCI number is 2 in step S52, then it is determined in step S53 whether or not two TrBks are detected as erroneous in the CRC error detection. If the determination in step S53 is NO, control is passed to step S55. If the determination in step S53 is YES, then the ERR counter is incremented by 1 in step S54, and control is passed to step S55.

In step S55, the total number counter is incremented by 1. In step S56, an error rate is computed, thereby returning control to step S51.

FIG. 11 is a block diagram of the circuit for performing the process of the fourth practical example.

In this example, the TFCI number for the TFCI total number counter specifying a plurality of TrBks is input from the TFCI detection unit to the TFCI error rate arithmetic unit, and when the error control, etc. process unit outputs NG for the TrBks in the error detection process, a signal is input into the TFCI error rate arithmetic unit. The TFCI error rate arithmetic unit computes the error rate based on the process shown in FIG. 10.

FIGS. 12 through 15 are explanatory views of the fifth practical example when all detection algorithms of the first through fourth practical examples of the TFCI error detecting method.

Figure 12:
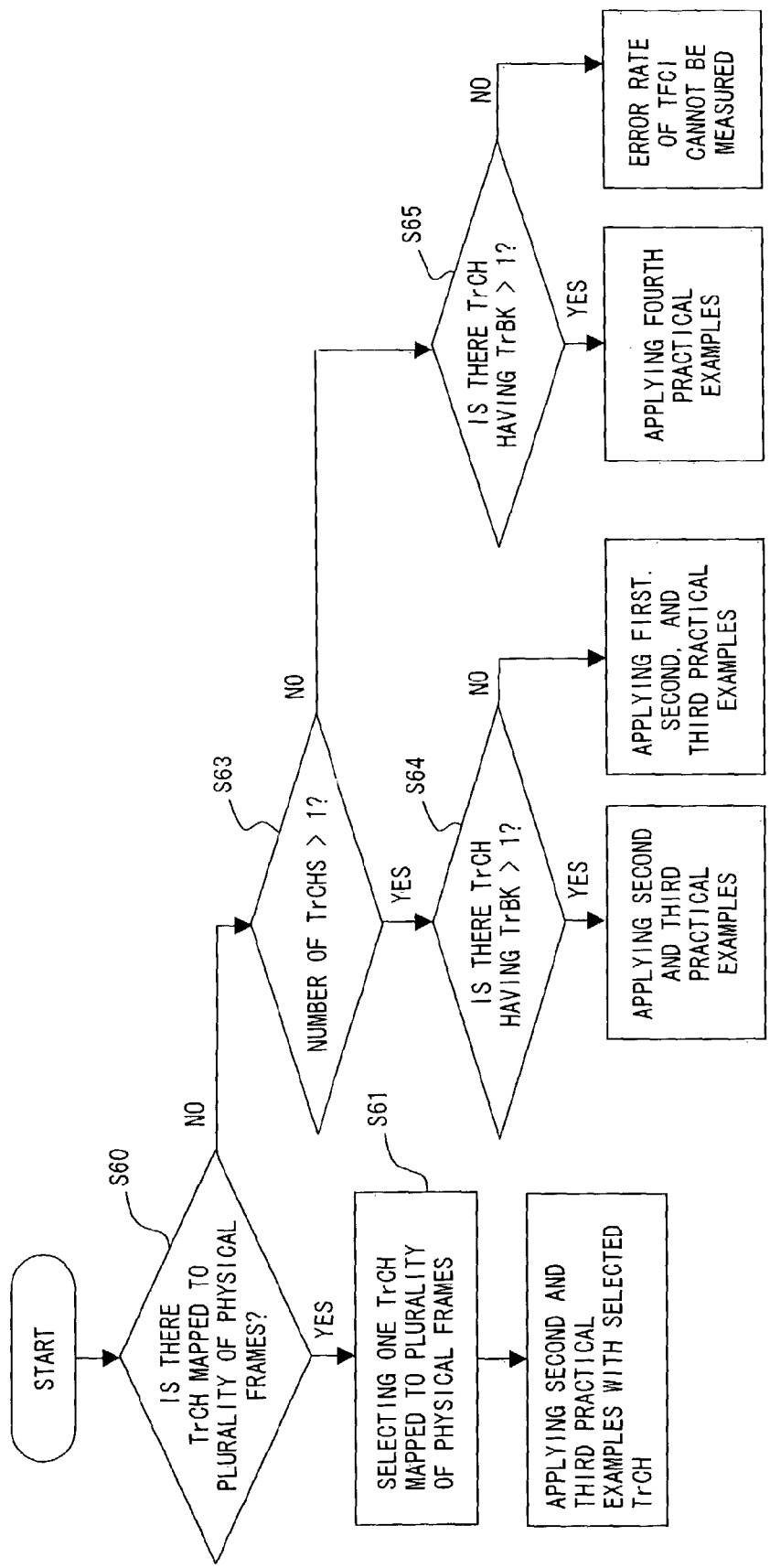
FIG. 12 shows the fifth practical example (1) including all algorithms for the first through fourth examples of a TFCI error detecting method.

In the fifth practical example, it is practical to select an applicable algorithm as shown in FIG. 12 depending on the TrCH used when a call is connected.

The significance of the combination of a plurality of detection algorithms resides in a large number of total number counter for measuring an error rate. Therefore, when there are TrCHs mapped to a plurality of physical frames, the OK/NG of the TFCI can be detected for each frame regardless of the existence of data if the second and third practical examples are applied. As a result, a combination with another algorithm is not required.

In the first through third practical examples, the OK/NG is not always detected for each frame, a combination with another algorithm is used.

In FIG. 12, it is first determined in step S60 whether or not there is a TrCH mapped to a plurality of physical frames. If the determination in step S60 is YES, one TrCH mapped to a plurality of physical frames is selected. Using the selected TrCH, the second and third practical examples are carried out.

If the determination is NO in step S60, control is passed to step S63, and it is determined whether or not the number of TrCHs is larger than 1. If the determination in step S63 is YES, then it is determined in step S64 whether or not there is a TrCH having a TrBk larger than 1. If the determination is YES in step S64, then the second, third, and fourth practical examples are applied. If the determination is NO in step S64, then the second and third practical examples are applied.

If the determination in step S63 is NO, it is determined in step S65 whether or not there is a TrCH having a TrBk larger than 1. If the determination in step S65 is YES, the fourth practical example is applied. If the determination in step S65 is NO, then it is determined that the error rate of the TFCI cannot be measured.

FIG. 12 shows "Error rate of TFCI cannot be measured", but practically there are no such cases. For example, if there can be the case, the number of TrCHs=1, the number of TrBks=1, and one unit of data in a physical frame result in a short length of data. If the length of data is short, there is a small distance between the TFCI and Data. Therefore, in the above mentioned case, the present embodiment can be applied, but the effect is small.

Described below is the case in which the second through fourth practical examples are combined for use.

Consider that the number of TrCHs is 3 CHs as follows.
TrCH0: 1 unit for transmission of 2 TrBks at maximum
TrCH1: 1 unit for transmission of 2 TrBks at maximum
TrCH2: 1 unit for transmission of 1 TrBk at maximum
Only the combination shown in FIG. 13 is used.

A measurement can be made when there are two or more TrBks inside and outside the TrCH because the second through fourth practical examples are combined for use.

FIG. 14 is a flowchart of the process of combining the second through fourth practical examples.

First, in step S70, the total number counter and the ERR counter are initialized to 0. In step S71, a TFCI is received. In step S72, the TFCI number is detected. If the TFCI number is 0, 1, 3, 8, then control is returned to step S71. If the TFCI number is 2, 4 through 7, and 9 through 13, then control is passed to step S73. In step S73, it is determined whether or not all TrBks are detected as erroneous in the CRC error detection. If the determination in step S73 is NO, control is passed to step S75.

If the determination in step S73 is YES, then the ERR counter is incremented by 1, and control is passed to step S75. In step S75, the total number counter is incremented by 1. In step S76, an error rate is computed, thereby returning control to step S71.

Figure 15:
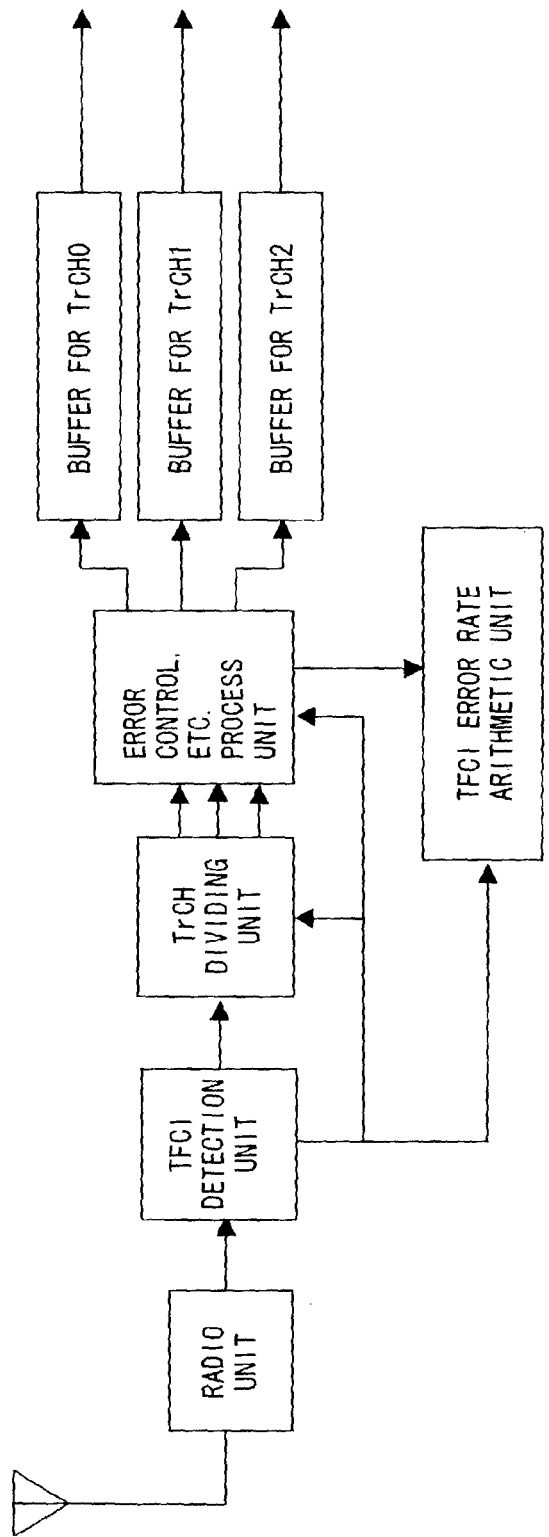
FIG. 15 shows the fifth practical example (4) including all algorithms for the first through fourth examples of a TFCI error detecting method.
Figure 16:
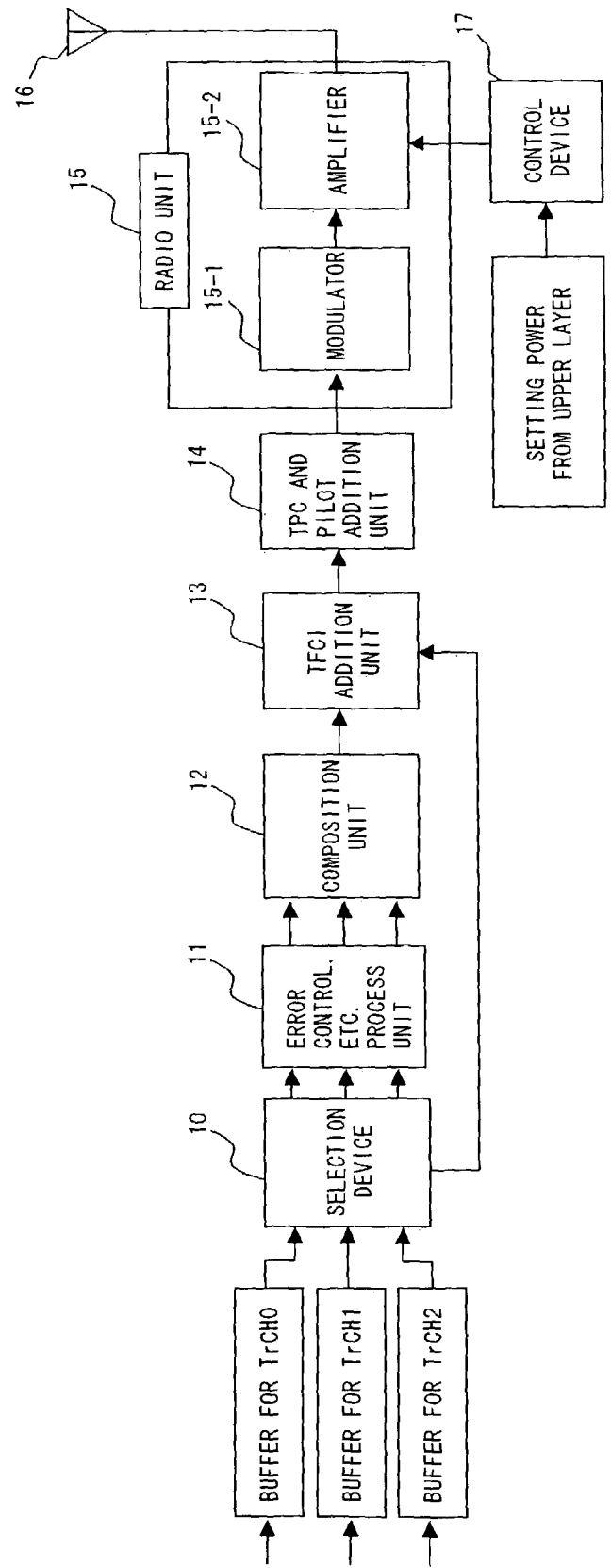
FIG. 16 is a block diagram of the configuration of a transmitting device.
Figure 17:
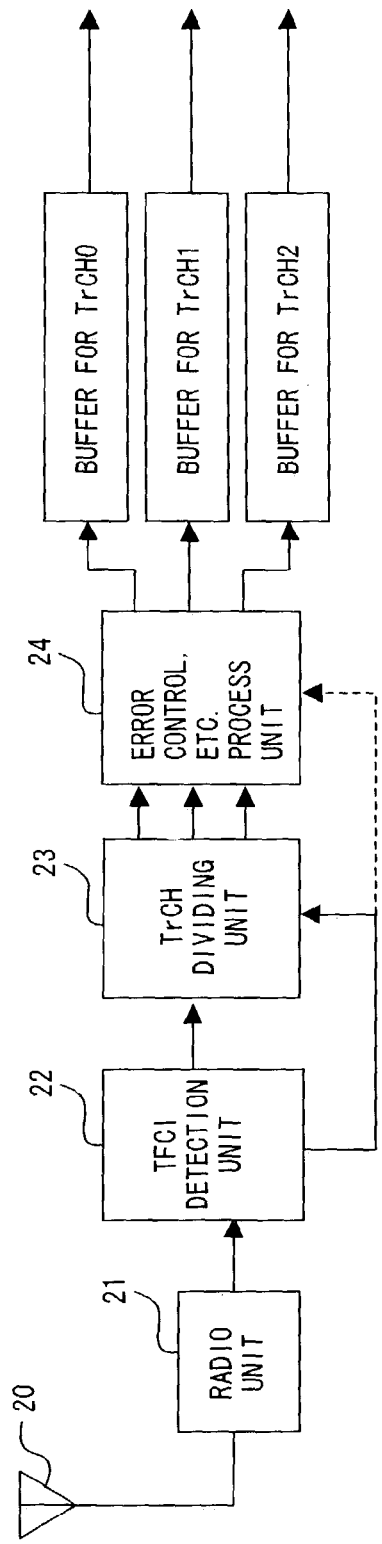
FIG. 17 is a block diagram of the configuration of a receiving device.

FIG. 15 is a block diagram of the circuit for performing the process shown in FIG. 14.

A detection result of the TFCI detection unit and output from the error control, etc. process unit are input into the TFCI error rate arithmetic unit. The detection result of the TFCI detection unit is used in counting the total number of TFCIs specifying a plurality of TrCHs. The output of the error control, etc. process unit is input into the TFCI error rate arithmetic unit when all specified TrBks of the TrCH indicate NG in the error detection. The TFCI error rate arithmetic unit computes the error rate of the TFCI by performing the process shown in FIG. 14.

In the above mentioned embodiment, the TFCI transmission power is controlled for example, but the power control of a PILOT bit portion and a TPC bit portion can also be performed.

For example, the power control of the PILOT bit portion is performed as follows.

To perform the power control of the pilot portion, it is necessary to measure the error rate of the pilot portion. In the pilot portion, a bit pattern can be uniquely determined by a slot format. That is, the pilot portion is known to the receiver. A practical arrangement is described in 3GPP 25.214 TABLE 12.

Since the pilot portion is known data, an error rate can be easily estimated by comparing received data with known data. That is, if they match each other, the data is correct. If they do not match, the data is erroneous.

Thus, if an error rate is obtained, the transmission power control can be performed only on the pilot portion by changing the gain of the power amplifier of the transmitting device of the base station or the mobile terminal.

The power control of the TPC bit portion can be performed as follows.

The error rate of the TPC bit portion is to be measured to control the power of the TPC bit portion. The number of bits of the TPC bit portion uniquely depends on the slot format, and the same data is repeated in the same slot. A practical arrangement is described in 3GPP 25.214 TABLE 13.

Since the same data is repeated, an error rate can be estimated by counting the number of different bits in the data.

For example, if NTPC is 2,
the number of errors is 0 if the received data is "00" or "11".

If the received data is "01", then any data is erroneous. Therefore, the number of errors is 1.

Similarly, if the received data is "10", then any data is erroneous. Therefore, the number of errors is 1.

If NTPC is 8,
the number of errors is 0 if the received data is "00000000" or "11111111".

If the received data is "01000000", then there is the strong probability that the second bit is erroneous. Therefore, the number of errors is 1.

If the received data is "01110000", then there is the strong probability that the second, third, and fourth bits are erroneous. Therefore, the number of errors is 3.

Thus, if the error rate is computed from the number of errors, the gain of the power amplifier is changed, and the transmission power control of the TPC bit portion can be performed.

The present invention realizes error rate control with wasteful power consumption minimized in the transmission power control.

What is claimed is:

1. A wireless base station comprising:
    a transmitter configured to transmit a data signal and a TPC (transmit power control) signal to a same mobile station; and
    a control unit configured to regulate transmission power of the TPC signal in accordance with an error rate of the TPC signal in the mobile station.

2. The wireless base station according to claim 1, wherein the control unit controls transmission power in an increasing direction when the error rate is a given value or more, and controls transmission power in a decreasing direction when the error rate is another given value or less.

3. The wireless base station according to claim 1, wherein the TPC signal is in a signal format of a W-CDMA (wideband code division multiple access) system, wherein the TPC signal includes one or more bits.

4. The wireless base station according to claim 1, wherein the control unit regulates transmission power of the TPC signal independently from transmission power of the data signal.

5. A mobile station comprising: a receiver configured to receive a data signal and a TPC (transmit power control) signal transmitted from a wireless base station, a control unit configured to regulate transmission power of the TPC signal in accordance with an error rate of the TPC signal in the mobile station.

6. The mobile station according to claim 5, further comprising:
    a control unit configured to measure the error rate of the TPC signal,
    wherein the TPC signal includes one or more bits.

7. A communication method in a wireless communication system, the communication method comprising:
    transmitting a data signal and a TPC (transmit power control) signal from a transmitting device to a receiving device; and
    regulating transmission power of the TPC signal in accordance with an error rate of the TPC signal in the receiving device.

8. The communication method according to claim 7, wherein
    the regulating includes controlling transmission power in an increasing direction when the error rate is a given value or more, and controls transmission power in a decreasing direction when the error rate is another given value or less.

9. The communication method according to claim 7, wherein
    the TPC signal is in a signal format of a W-CDMA (wideband code division multiple access) system, wherein the TPC signal includes one or more bits.

10. The communication method according to claim 7, further comprising:
    receiving, at the receiving device, the data signal and the TPC signal from the transmitting device.

11. The communication method according to claim 7, further comprising:
    transmitting information indicating the error rate of the TPC signal from the receiving device to the transmitting device.

12. The communication method according to claim 7, further comprising:
    measuring a value indicating the error rate of the TPC signal in the receiving device.

13. A wireless communication system comprising a transmitting device and a receiving device, wherein
    the transmitting device comprises:
    a transmitter configured to transmit a data signal and a TPC (transmit power control) signal to a same receiving device, and
    a control unit configured to regulate transmission power of the TPC signal in accordance with an error rate of the TPC signal in the receiving device.

14. The wireless communication system according to claim 13, wherein the TPC signal is in a signal format of a W-CDMA (wideband code division multiple access) system, wherein the TPC signal includes one or more bits.

15. The wireless communication system according to claim 13, wherein the receiving device comprises a receiver configured to receive the data signal and the control signal transmitted from the transmitting device.

16. The wireless communication system according to claim 13, wherein the receiving device comprises a transmitter configured to transmit information indicating the error rate of the TPC signal to the transmitting device.

* * * * *